United States Patent [19]

Lewis

[11] 3,897,081
[45] July 29, 1975

[54] VEHICLE SAFETY SYSTEM

[75] Inventor: Donald J. Lewis, Troy, Mich.

[73] Assignee: Allied Chemical Corporation, New York, N.Y.

[22] Filed: Nov. 29, 1972

[21] Appl. No.: 310,284

[52] U.S. Cl. ......... 280/150 AB; 9/316; 200/61.58 B; 200/61.6; 339/15; 280/150 SB
[51] Int. Cl. ........................................... B60r 21/08
[58] Field of Search ................ 280/150 AB, 150 SB; 200/61.58 B, 61.6; 339/147, 15; 297/386, 390; 9/316

[56] References Cited
UNITED STATES PATENTS

| 3,317,243 | 5/1967 | Weman | 280/150 SB |
|---|---|---|---|
| 3,381,268 | 4/1968 | Boblitz | 280/150 SB |
| 3,624,601 | 11/1971 | Routzahn | 200/61.58 B |
| 3,672,699 | 6/1972 | De Windt | 280/150 AB |
| 3,675,942 | 7/1972 | Huber | 280/150 AB |
| 3,682,498 | 8/1972 | Rutzki | 280/150 AB |
| 3,706,463 | 12/1972 | Lipkin | 280/150 AB |
| 3,781,497 | 12/1973 | Stephenson | 200/61.58 B |
| 3,791,670 | 2/1974 | Lucore et al. | 280/150 AB |

Primary Examiner—David Schonberg
Assistant Examiner—John P. Silverstrim
Attorney, Agent, or Firm—Ernest D. Buff; Jonathan Plaut

[57] ABSTRACT

A vehicle safety system comprising an inflatable safety restraint assembly for positioning about a person, a source of pressurized gas, a sensing element adapted to actuating the source of pressurized gas which in turn inflates the safety restraint, a source of electrical energy and electrical conductors connecting the components. The system is operational only when the safety restraint assembly is positioned about the person and the vehicle is subjected to abnormal conditions which tend to violently displace the person from his seat.

6 Claims, 5 Drawing Figures

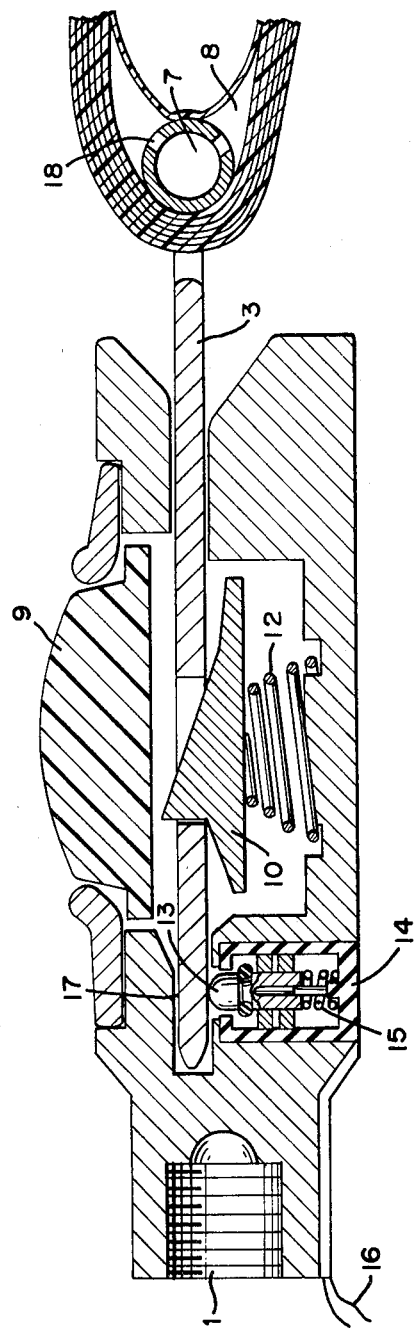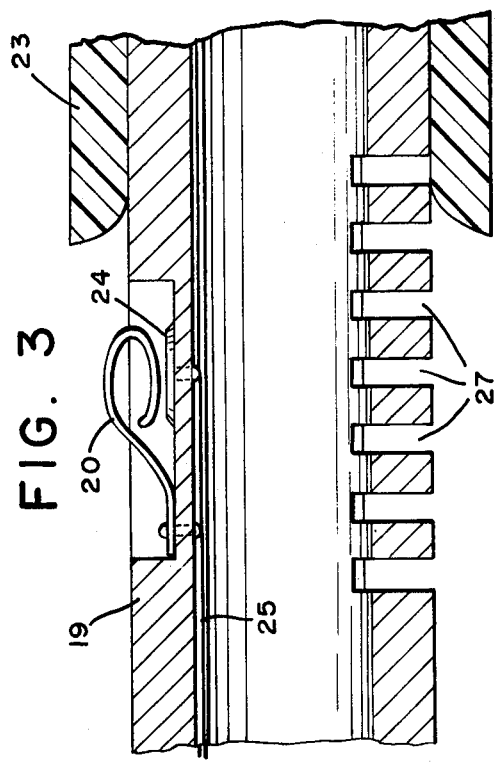

VEHICLE SAFETY SYSTEM

BACKGROUND OF THE INVENTION

1. Field of the Invention

This invention relates to vehicle safety systems, and more particularly to restraints having inflatable sections adapted to protect the wearer if the vehicle is involved in a collision.

2. Description of the Prior Art

Inflatable seat restraints which inflate to protect the wearer riding in a vehicle involved in a collision at the moment of impact have been suggested. Such systems may include a sensing device to initiate release of pressurized gas to the inflatable restraint in response to conditions or forces which develop during a crash. There are situations, however, when it would be disadvantageous to release the pressurized gas even when a proper signal for inflation has been transmitted by a sensing element. First, there is the situation where a parked car, unattended, is struck by a moving vehicle. Release of the gas would only add to the cost of repairs because of the necessity of rearming or replacing the source of pressurized gas. In another situation, the car is involved in a collision, and the occupant has carelessly failed to "buckle-up." Whether, depending on the relation of the source of pressurized gas to the inflatable restraint, the result is to inadvertently inflate the restraint, or alternately to discharge the gas into the vehicle with almost explosive force, the results are undesirable and corrective measures should be sought.

SUMMARY OF THE INVENTION

The present invention is directed to a vehicle safety system. It comprises an inflatable seat belt assembly adapted to be positioned about a person in the vehicle. A circuit means is connected to the seat belt assembly and to a source of electrical power adapted to supply an electrical impulse. Circuit closing means are provided for closing the circuit means when the belt is positioned about the person. The system also has a gas source connected to the circuit means for supplying pressurized gas to the inflatable seat belt assembly upon receipt of the electrical impulse. A sensing means connected to the circuit means and responsive to collision of the vehicle operates, with the circuit means closed, to transmit the impulse to the gas source upon collision of the vehicle.

The source of electric energy is generally the service battery in the vehicle and the circuit closing means, is generally an electric switch in the buckle and tongue assembly, or other fastening device, or an electric switch in a seat belt retractor which moves from an open to a closed position when sufficient belt has been withdrawn for buckling about an individual.

BRIEF DESCRIPTION OF THE DRAWINGS

FIG. 2 is an enlarged cross sectional view at the buckle and tongue at FIG. 1 taken along line 2—2. In the illustration, a plunger switch is held in closed position against its bias by the plane surface of the tongue. Wires for attachment to means for initiating the release of pressurized gas and a female connection for the attachment of such a source directly to the buckle, are included.

FIG. 3 is a cross sectional view of a section of the manifold of an "Inflator-Connector for Inflatable Seat Belts," such as that disclosed in copending U.S. Pat. application, Ser. No. 309,404, filed Nov. 24, 1972, illustrating one of several ways in which a switch could be added which would be in closed position when the coupler is engaged with the manifold, and in open position when the coupler is not engaged.

DETAILED DESCRIPTION OF THE INVENTION

Figure 1:
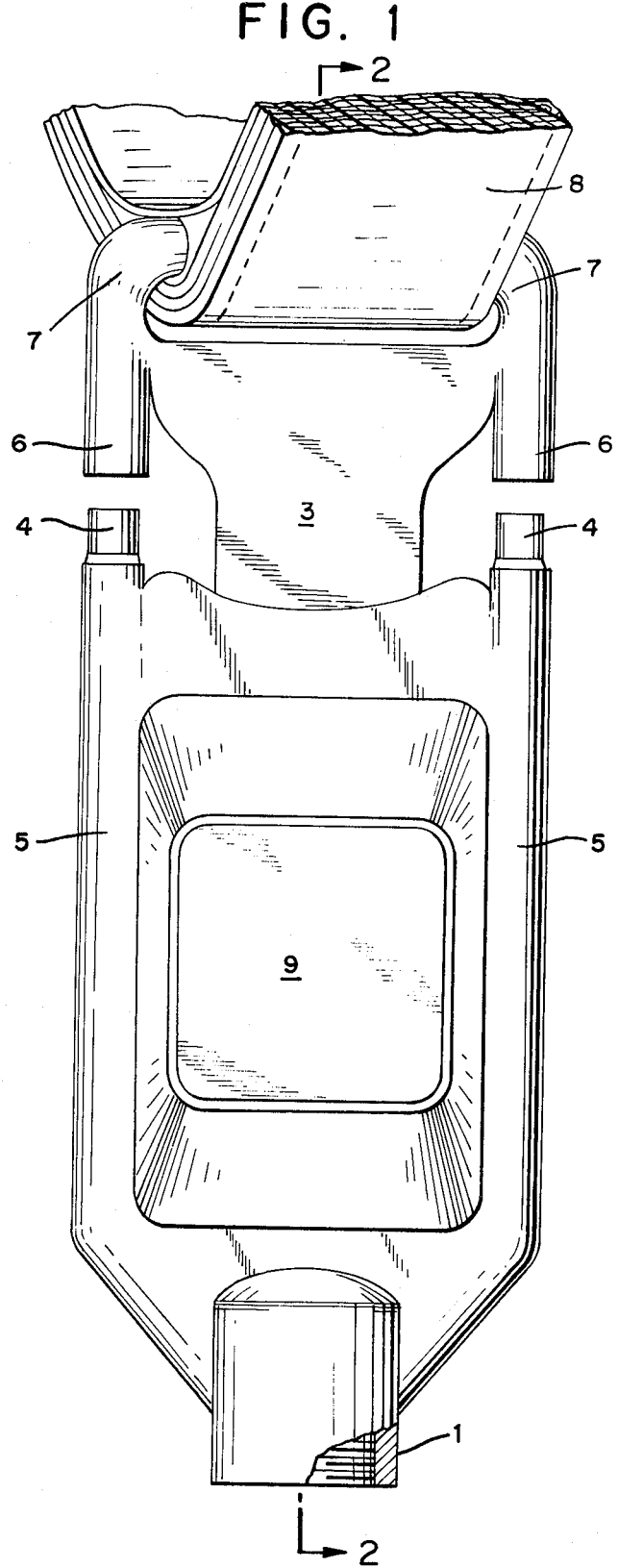
FIG. 1 is an enlarged plan view of a preferred component of our invention. In this embodiment the fastening device is a seat belt buckle attached to a source of pressurized gas, and a tongue, shown with a portion of an inflatable belt attached, partially inserted into the buckle. One method of engaging conduits attached to the tongue with conduits attached to the buckle is illustrated.

In the vehicle safety system of the present invention there is a sensing device adapted to close an electric circuit in response to abnormal conditions which tend to violently displace a person in the vehicle from his seat. A collision is representative of the type of abnormal condition to which such a sensing device responds by closing an electric circuit. In order that the sensing device may transmit an electrical impulse, it is connected with a source of electrical energy, preferably the service battery of the vehicle.

Also included in the circuit is an inflatable seat belt assembly which includes a circuit-closing device or switch which is in the open position when the seat belt or harness is not fastened about a person, and in the closed position when fastened. The switch may be in a seat belt retractor wherein it is in an open position when the belt is substantially retracted, and in closed position when the belt is sufficiently extended to be fastened about a person in the vehicle. For practical reasons such a retractor preferably moves its switch to the closed position just before enough belt has been extended for fastening about a person to insure its effectiveness with a small child or very thin person.

Alternately, the circuit closing device may be a switch associated with the fastening device for securing the belt or harness about an individual. Such a switch is in the open position when the fastening device is in its unfastened or unlatched position, and in its closed position when the fastening device is fastened, indicating that the inflatable seat belt or harness is being worn. This fastening device could be an "Inflator-Connector for Inflatable Seat Belts," such as disclosed in copending U.S. Pat. application, Ser. No. 309,404, filed Nov. 24, 1972. The fastening device comprises two elements having a source of pressurized gas connected to the first element which is anchored to the vehicle, said first element having conduit means in communication with the source of pressurized gas; and a second element having a conduit in communication with the inflatable seat belt which will engage the conduit of the first element in substantially gas-tight relationship when the second element is engaged with the first element thereby placing the source of pressurized gas in communication with the inflatable seat belt. Many different types of switch devices could be introduced into these inflator connectors, as for example, the spring switch of FIGS. 3 and 4 which is depressed into its closed position when the coupler is slipped over it.

Where the fastener comprises a seat belt buckle and tongue, a similar switch can be employed which is depressed by the tongue on insertion. Another type of switch can be employed wherein a biased contact is urged into its closed position when inserted for latching engagement by the tip of the tongue and held in closed position until the tongue is disengaged. Such a switch, which may be adapted for response to either its open or closed position on the insertion of the tongue, is disclosed in copending U.S. Pat. application, "Vehicle Seat Belt Warning System," filed July 1, 1972, Ser. No. 158,920, now abandoned.

Preferably, a tongue and buckle assembly is employed wherein a plunger switch at one side of the channel for the tongue is biased toward the channel with the inclined or rounded terminus of the plunger extending into the channel whereby, when the tongue is inserted, it depresses the plunger of the switch in a direction substantially perpendicular to the plane of the tongue from an open position to a closed position, and wherein the plane surface of the tongue maintains the plunger switch in the depressed, closed-circuit position until said tongue is disengaged and withdrawn from the buckle. Such an arrangement with a plunger switch positioned within a buckle adapted for conveying gas from a source of pressurized gas to an inflatable seat belt when the tongue is engaged in the buckle is shown in accompanying drawings FIGS. 1 and 2. The construction of such a switch, and its positioning within a seat belt buckle is disclosed in more detail in copending U.S. Pat. application, "Buckle with Plunger Switch," filed Nov. 12, 1972, Ser. No. 297,137, and incorporated herein by reference. In this embodiment, the source of gas is connected to the buckle. The source of pressurized gas may be a pressure chamber attached directly to and adjacent to the first element of the fastening device, or it may be conducted thereto from a distance by conduit. Conduit communicating with the source of pressurized gas and attached to the buckle is adapted for engagement with conduit in communication with the inflatable seat belt and attached to the tongue. Engagement is achieved by having preferably a tapered male fitting as the terminous of one conduit and a corresponding female fitting for the other. These are positioned in axial alignment for substantially gas-tight engagement when the tongue is latched within the buckle and for ready disengagement simultaneously with the disengagement of the tongue.

The means of closing a circuit in the seat belt assembly may alternately be incorporated into a seat belt retractor either of the reel type or the linear type often used overhead in a vehicle fitted with a safety belt harness. An example of a suitable switch incorporated into a reel type retractor is disclosed in copending U.S. Pat. application, "Retractor with Switch," filed Dec. 21, 1971, Ser. No. 210,532, which is incorporated herein by reference. This retractor has a switch that opens after sufficient belt has been withdrawn to position about an individual. In the present invention the retractor is employed to close the switch when sufficient belt has been withdrawn to position about an individual. This can be readily accomplished by the use of a relay, or more simply by the proper positioning of the cam which is adapted for such readjustment.

Referring now to the drawings wherein like numerals indicate like or corresponding parts throughout the several views:

FIG. 1 is a plan view of a seat belt buckle and tongue. In this embodiment, numeral 1 is a threaded female connection to which the source of pressurized gas is attached. On release of the gas it escapes through conduits 5, along the side or sides of the buckle. The tongue 3 is shown as partially inserted. When the tongue is fully inserted, nipples 4 of conduits 5 engage the female terminals 6 of conduits 7 in a substantially gas-tight relationship. Conduit 7 is sealed into inflatable seat belt 8. The tongue and conduits can be readily disengaged by depressing push button 9. Of course this arrangement is applicable to various types of buckles where release is to be had by lifting a lever or by other means.

FIG. 2 is a cross section of the buckle of FIG. 1 taken through line 2-2. In this drawing, the tongue 3 is in latched engagement within channel 17 of the buckle. It is held in place by latch bar 10, biased upwardly by spring 12. The tongue has depressed the rounded terminus of the plunger 13 or plunger switch 14, said plunger being biased toward the tongue 3 by spring 15. The wires 16 from the switch contacts are in the circuit which initiates release of the pressurized gas, as for example, by firing a squib which heats the gas and raises the pressure to burst a retaining rupture disc. The gas may alternately be generated and released by the electrical discharge of a cartridge, thus the pressurized gas may be supplied from a pressure chamber, it may be supplied partly as gas, stored under pressure, and partly as gas generated by combustion, or it may be supplied entirely by combustion as by firing of a cartridge. The gas enters connector 1, is conveyed along the sides of the buckle via conduits 5 which communicate with conduit 7, and is released through openings 18 into folded inflatable belt 8 into which said conduit is sealed. The belt is thereby inflated.

Figure 4:
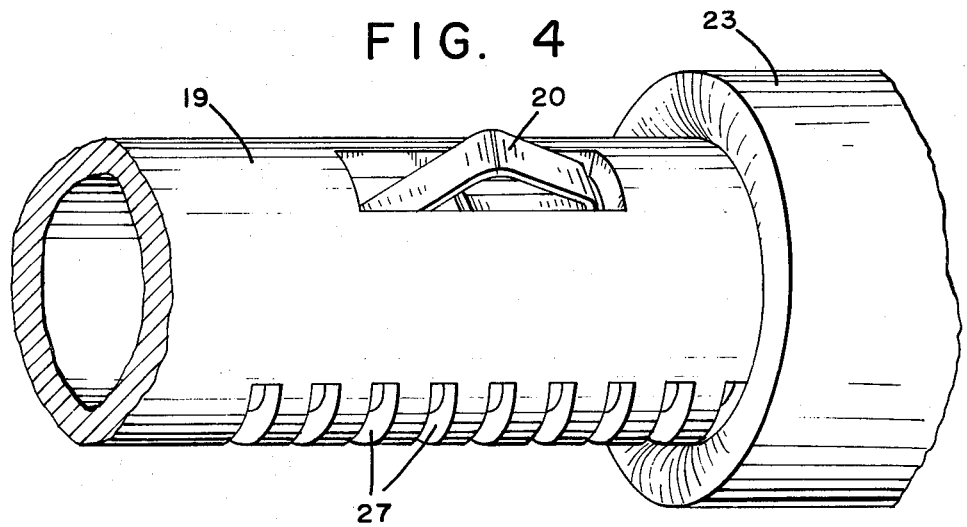
FIG. 4 is a perspective drawing of a section of the manifold of FIG. 3.

FIGS. 3 and 4 represent a portion of a fastener employing a manifold 19 and a coupler 23, FIG. 3 being a cross sectional view and FIG. 4 being in perspective. These represent a fastener as disclosed in U.S. patent application, "Inflator-Connector for Inflatable Seat Belts," previously referred to. In this instance, one of several possible types of switches is shown which can be incorporated therein. Spring contact shoe 20 extends above the surface of manifold 19. When coupler 23 which is in communication with an inflatable seat belt is slipped over the manifold 19 in a substantially gas-tight relationship it depresses contact shoe 20 which makes electric contact with contact point 24, closing a circuit. The connecting wires are shown at 25 within manifold 19 although they may be within the wall of the manifold, or disposed within a channel in its surface. Proper electrical insulation is assumed if the manifold is fabricated of a conducting metal. Openings 27 permit the escape of gas into corresponding openings in coupler 23.

Figure 5:
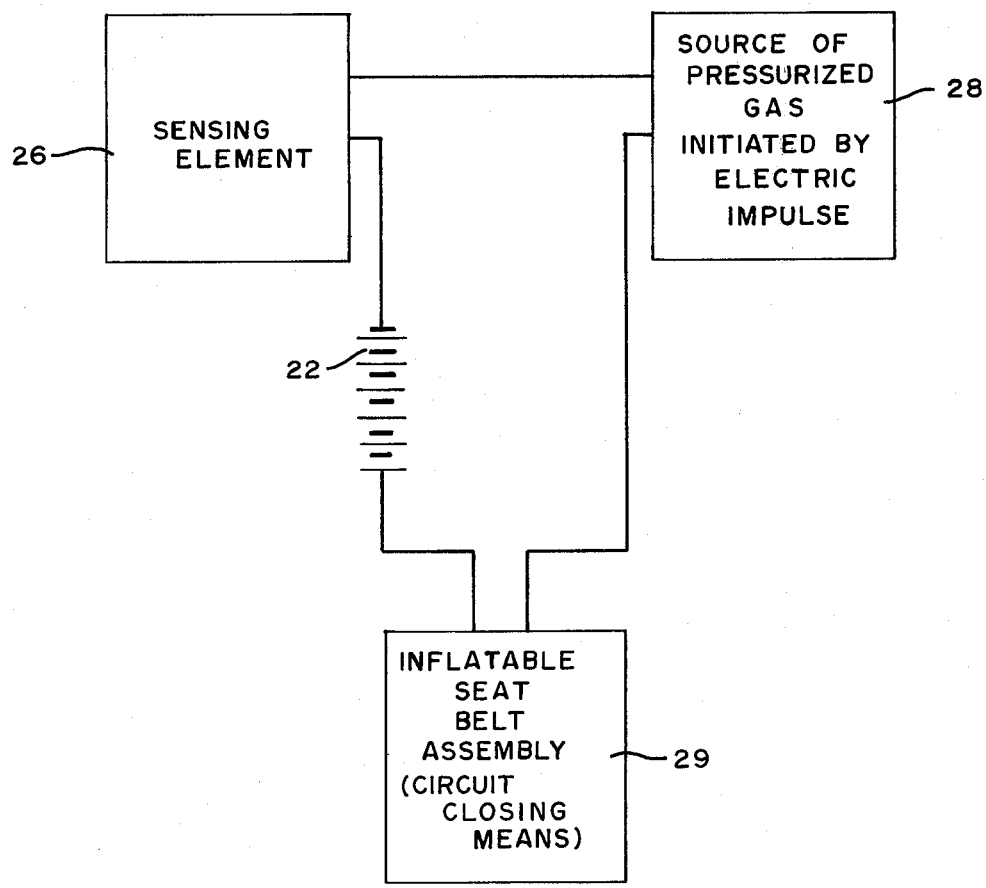
FIG. 5 diagrammatically represents the electrical connections between the sensing element which closes a portion of the circuit when subjected to selected conditions, such as those resulting from a collision, the source of pressurized gas which inflates the inflatable seat belt when the circuit is complete, the source of electrical energy, and the inflatable seat belt assembly which includes a switch in the fastening device, such as a tongue and buckle assembly, or in a seat belt retractor. The switch in the fastening device must be in the closed position at the time the sensing element closes its portion of the circuit in order for the circuit to be complete. Only when the circuit is complete, will the pressurized gas be released to inflate the seat belt.

FIG. 5 is a diagrammatic representation of the circuit connecting the source of energy 22 which generally consists of a service battery with the sensing element 26, the initiator for the release or generation of the pressurized gas 28, and the inflatable seat belt assembly (circuit closing means) 29. The latter represents the electric switch in the fastening device, preferably a plunger switch in a seat belt buckle, or alternately, an electric switch in a seat belt retractor. It can be seen that sensing element 26 sends an electric impulse to the initiator at 28 for the release of pressurized gas when abnormal conditions, such as occur at the time of a collision, are sensed by the device, but that this action can only occur if the circuit closing means 29 is in its closed position which only occurs when the seat belt or harness assembly is positioned about an individual.

While I have described the preferred embodiment of my invention, it will be understood that various modifications and changes can be made in the vehicle safety system described without departing from the spirit of this invention or the scope of the following claims.

I claim:
1. A vehicle safety system comprising:
   a. an inflatable seat belt assembly including a fastening device having a latched and an unlatched condition;
   b. circuit means connected to said seat belt assembly;
   c. circuit closing means for closing said circuit means in response to said latched condition of said fastening device;
   d. a source of electrical power connected to said circuit means for supplying an electrical impulse;
   e. a gas source connected to said circuit means for supplying pressurized gas through said fastening device to said inflatable seat belt assembly upon receipt of said electrical impulse; and
   f. sensing means connected to said circuit means, responsive to collision of the vehicle and operating, with said circuit means closed, to transmit said electrical impulse to said gas source upon collision of said vehicle,
whereby said electrical impulse can only be transmitted to said gas source when said fastening device is in said latched condition.

2. The vehicle safety system of claim 1 wherein said fastening device comprises a first element anchored to the vehicle, and a second element attached to the seat belt, and wherein the circuit closing means comprises an electric switch associated with the fastening device, said switch being in open position when the two elements are not engaged, and in closed position when the two elements are engaged.

3. The vehicle safety system of claim 2 wherein said first element comprises a seat belt buckle and said second element comprises a tongue, and wherein the switch is located in the buckle, said switch being urged into closed position when the tongue is thrust into the buckle, and maintained in the closed position by the tongue as long as it remains engaged with the buckle.

4. The vehicle safety system of claim 3 wherein the switch in the buckle is a plunger switch, the plunger of which operates in a direction substantially perpendicular to the direction of thrust of the tongue, is depressed into its closed position by the leading edge of the tongue, is retained in its closed position by the flat surface of the tongue, and is released to the open position only on withdrawal of the tongue from the buckle.

5. The vehicle safety system of claim 2 wherein the gas source is connected to the first element of the fastening device, said first element having conduit means in communication with the source of pressurized gas, the second element of the fastening device having a conduit in communication with the inflatable seat belt, for engaging the conduit of the first element in substantially gas-tight relationship when the second element is fastened to the first element, thereby placing the source of pressurized gas in communication with the inflatable seat belt, said conduit attached to the first element being readily detachable from the conduit of the second element simultaneously with the separation of the first element and the second element of the fastening device.

6. The vehicle safety system of claim 2 wherein the gas source comprises a pressure chamber attached directly to and adjacent to the first element of the fastening means.

* * * * *